(No Model.) 3 Sheets—Sheet 1.
R. HASSON.
PLANTER AND FERTILIZER DISTRIBUTER.
No. 488,356. Patented Dec. 20, 1892.
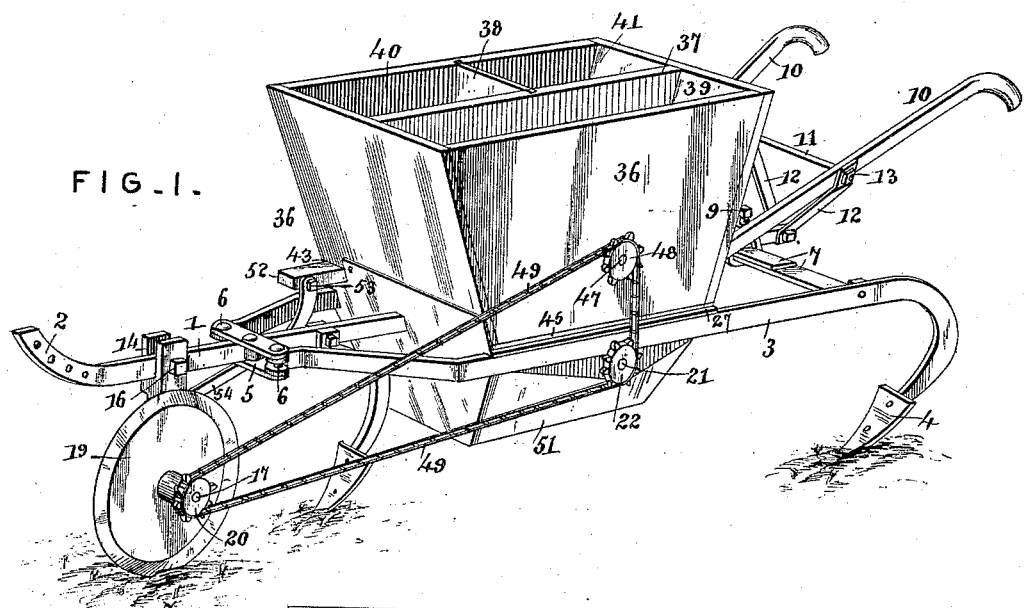
FIG. 1.
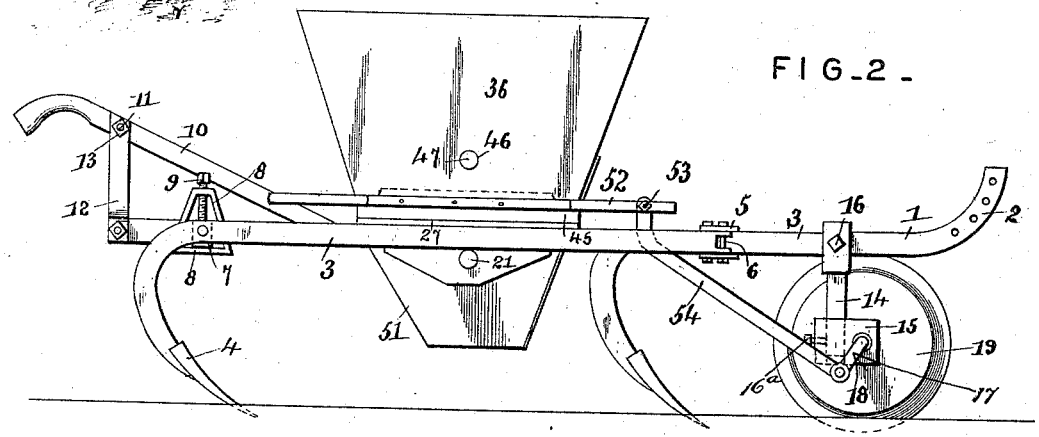
FIG. 2.
FIG. 10.
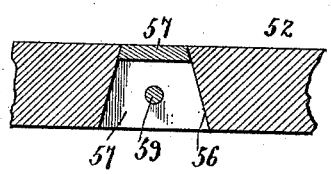
FIG. 11.
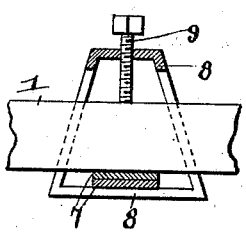
Witnesses:
Jas. K. McCathran
W. J. Duvall
Inventor
Robert Hasson
By his Attorneys,
C. A. Snow & Co.

(No Model.) 3 Sheets—Sheet 2.
R. HASSON.
PLANTER AND FERTILIZER DISTRIBUTER.
No. 488,356. Patented Dec. 20, 1892.
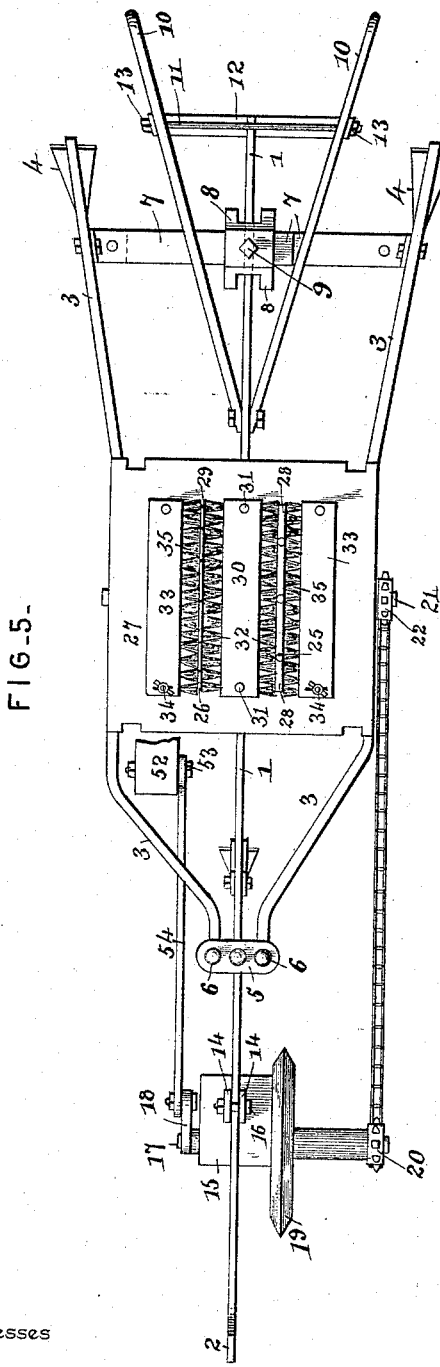
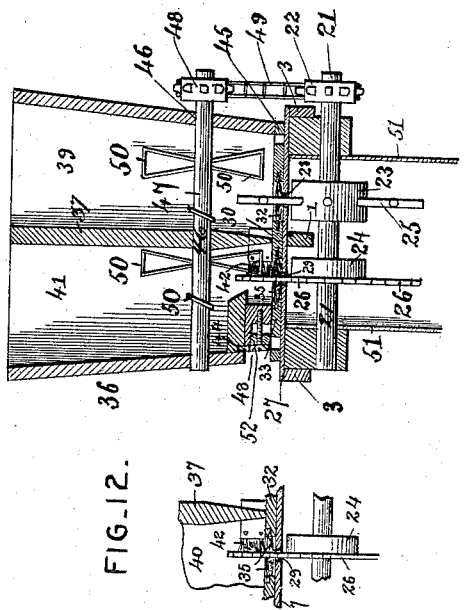
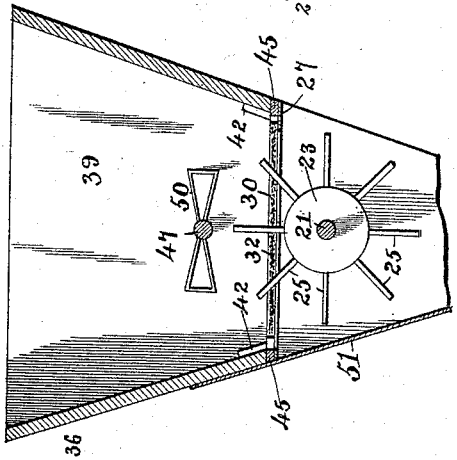
Witnesses
Jas. K. McCuthran
W. S. Duvall
Inventor
Robert Hasson
By his Attorneys,
C. A. Snow & Co.

(No Model.) 3 Sheets—Sheet 3.

R. HASSON.
PLANTER AND FERTILIZER DISTRIBUTER.

No. 488,356. Patented Dec. 20, 1892.

Witnesses:
Jas. K. McCathran
W. J. Duval

Inventor
Robert Hasson
By his Attorneys,
C. A. Snow & Co.

UNITED STATES PATENT OFFICE.

ROBERT HASSON, OF GADSDEN, ALABAMA.

PLANTER AND FERTILIZER-DISTRIBUTER.

SPECIFICATION forming part of Letters Patent No. 488,356, dated December 20, 1892.

Application filed August 28, 1891. Serial No. 403,992. (No model.)

*To all whom it may concern:*

Be it known that I, ROBERT HASSON, a citizen of the United States, residing at Gadsden, in the county of Etowah and State of Alabama, have invented a new and useful Planter and Fertilizer-Distributer, of which the following is a specification.

This invention relates to a combined cotton, pea, or corn planter, and guano-distributer; and the objects in view are to provide a machine adapted to perform the above offices in an efficient and satisfactory manner, and to effect a saving in the seed, and produce a perfect plant as a result of its operation.

With the above main objects in view, the invention consists in certain features of construction hereinafter specified and particularly pointed out in the claims.

Figure 6:
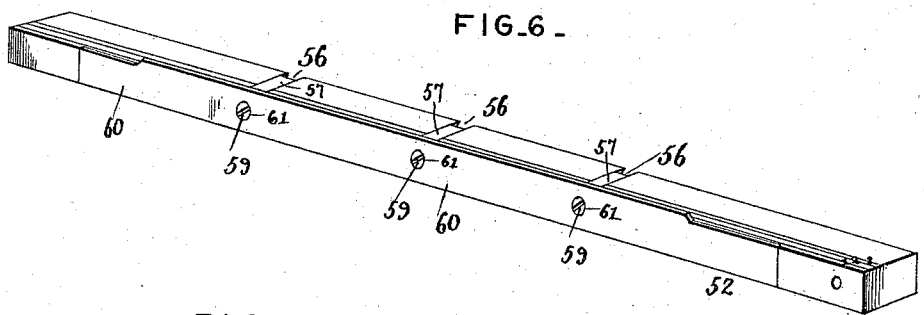
Figure 7:
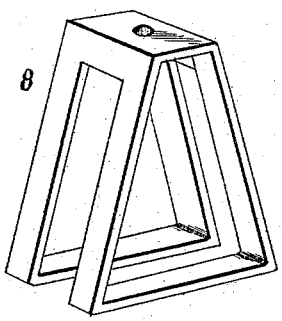
Figure 8:
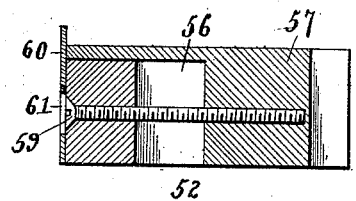
Figure 9:
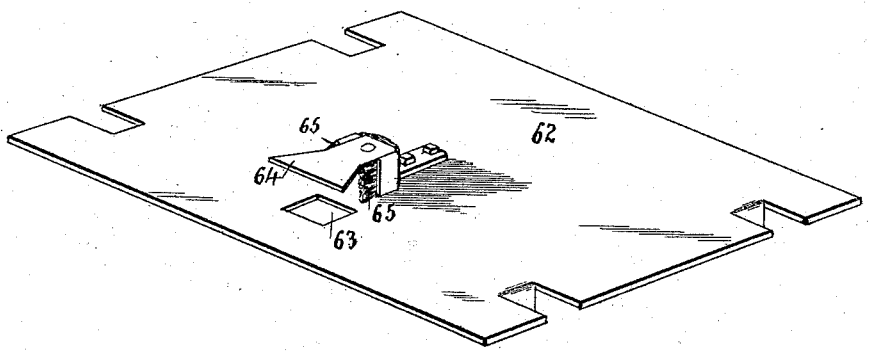

Referring to the drawings:—Figure 1 is a perspective of a machine constructed in accordance with my invention. Fig. 2 is side elevation. Fig. 3 is a longitudinal section through the guano portion of the hopper. Fig. 4 is a transverse section. Fig. 5 is a plan of the machine, the hopper removed. Fig. 6 is a detail in perspective of the seed-slide. Fig. 7 is a detail in perspective of the stirrup casting for connecting the plow-connecting bar with the main beam. Fig. 8 is a transverse section of the seed-slide. Fig. 9 is a perspective of the hopper bottom employed for dropping corn, peas, &c. Fig. 10 is a longitudinal section through a seed-opening in the slide. Fig. 11 is a rear elevation and partial section of the stirrup. Fig. 12 is a detail sectional view of the bottom of compartment 40 of the hopper.

Like numerals of reference indicate like parts in all the figures of the drawings.

1 designates the main beam of the framework, and the same has its front end upturned and perforated to form a clevis 2, while its rear end terminates between a pair of opposite plow-beams 3, the ends of which are downwardly curved and carry covering-shovels 4. The front ends of the beams 3 are converged as shown and are loosely pivoted in a bracket 5, by bolts 6. The rear ends of the beams 3 are connected by a pair of overlapping transverse connecting bars 7, by which means the side-beams may be adjusted suitable distances apart.

8 designates a bifurcated stirrup, transversely through which the adjusting bars 7 pass, and longitudinally through which, and embraced by the bifurcations, passes the rear end of the main beam 1. A binding-screw 9 is threaded in the perforation in the upper end of the stirrup, and at its lower end bears upon the upper face of the main beam 1, thus clamping the stirrup, main beam, and adjusting-bars snugly together, and serving as a means of adjustment therefor.

10 designates a pair of handles, converged toward their front ends and bolted to the main beam 1, in front of the stirrup. These handles diverge at their rear ends and are provided with a transverse connecting-bar 11, the ends of which extend beyond the handles and receive the upper perforated ends of a pair of downwardly-converging straps 12, nuts 13 being applied to the rod 11 and serving to connect the strap with the rod.

14 designates a bifurcated standard, which embraces the main beam 1 near its front end, by a bolt 16 depends therefrom and passes through a cubical block 15 which is swiveled on the standard. The block may be raised and lowered upon the standard and locked in any of its points of adjustment by means of a set-screw 16ª passed through the block and bearing upon the standard. Journaled transversely in the block, at one side of the standard 14, is an axle 17, and the same is provided at one end with a crank 18, while near the opposite end it has keyed thereon a colter 19, having a sharp cutting periphery. A sprocket-wheel 20 is located upon the axle beyond the colter.

In suitable bearings formed in the side-beams 3, there is journaled a transverse shaft 21, which at one side is provided with a sprocket wheel 22. This shaft at opposite sides of the main beam 1, carries hubs 23 and 24, from the former of which radiate spokes 25, and to the latter is secured a toothed disk or circular saw 26.

Supported upon the beams 1 and 3 is a metal plate 27, provided at opposite sides of its center with slots 28 and 29, the former receiving the spokes 25, while through the latter project the teeth of the wheel 26. Between the slots a block 30 is rigidly secured by bolts 31, which pass through the plate and the block. At the outer sides of this block project brushes 32, which extend inwardly over the slots 28 and 29, and against the feed-devices of the hopper. At the outsides of the slots similar blocks 33 are secured by set-bolts 34 at one end and pivoted at the other, and are provided with lines of brushes 35, which brushes may be adjusted inwardly toward the wheels and the brushes 32.

36 designates a hopper adapted to contain cotton-seed and guano, and subdivided longitudinally by a partition 37, forming opposite compartments, one of which is subdivided by a removable partition 38, forming front and rear compartments. The long compartment 39 is for guano, while the opposite small compartments 40 and 41 may be employed for holding cotton-seed. The bottom of the compartments 40 and 41 is provided with a contracted opening toward the inner edge of the same, and at opposite ends of the opening outwardly disposed brushes 42 are secured. The bottom is recessed as at 43, and in the roof of the recess a groove 44 is formed. The bottom has also secured thereto a rectangular plate 45, which is open to correspond with the openings in the bottom of the hopper. The hopper 36 is mounted upon the brush-holding blocks, and is supported by the plate 27. The hopper is provided with transverse bearing-openings 46, and through the same passes an agitator shaft 47, one end of which carries a sprocket-wheel 48. The sprocket-wheels 48, 22, and 20 are all connected by an endless sprocket-chain 49, whereby they all move in unison. The agitator-shaft 47 within the hopper, is provided with a series of looped wire stirring-arms 50, by which the cotton seed and guano are constantly stirred or agitated.

Under the hopper is located a discharge-snout 51, the rear wall of which is removed to permit the operator viewing the cotton seed and guano as discharged, and thus judging whether or not the output is sufficient or too great.

52 designates a seed-slide, which is mounted for reciprocation in the opening 43 of the bottom of the hopper, and at its front end is pivoted as at 53 to a pitman 54, pivotally connected at its front end to the wrist-pin of a crank 18 of the colter-axle 17. The inner face of the seed slide runs in contact with the brushes 42, as best shown in Fig. 4 and between its ends is provided with a series of inverted V-shaped recesses 56 best shown in Fig. 10. L-shaped plates 57 are mounted within the recesses and are adjustable by means of set-screws 59 passing through the slide opposite the notches or openings, and engaging the plates. These set-screws have mounted over their outer ends a metal plate 60, provided at intervals with openings 61, corresponding with the screws, and through which a screw-driver may be passed for adjusting the screws and hence the plates within the seed-openings. The upper face of the slide is provided with a scale, each degree indicating the width of a grain, so that the operator may gage the plates to permit of its containing one, two, or three grains at each movement of the slide.

In operation, the brushes are adjusted a suitable distance from each other, and with relation to the feed-wheels, and by reason of the wheels running in contact with the brushes, the former are prevented from clogging and the cotton seed is discharged as independent seeds, and prevented from clustering and being discharged in this condition.

62 designates a metal plate adapted to serve as a bottom for the hopper in lieu of the brush-carrying plate heretofore described, and to thereby adapt the machine to serve as a corn or pea planter. The plate 62 is provided at one side of its center with a square opening 63, and arranged over the same is an inverted L-shaped keeper 64, at each side of which, and projecting toward the opening 63 is a brush 65. In employing this plate the partitions are removed from the hopper, and the latter and the brush-carrying plate also removed, as is also the agitator-shaft and feed-shafts. The seed-sliding bar is now passed under the keeper 64, and the reciprocations of the same serve to drop at the intervals from one to any desired number of seed, to the hill. More than one hole may be formed in the plate 62, if desired, and in such case the keeper and brushes will be duplicated.

Having described my invention, what I claim is—

1. In a machine of the class described, the combination with a central beam, the opposite side-beams, the shovels, and the hopper mounted on the beams, of an agitator-shaft mounted in the hopper, a feed-shaft journaled below the hopper and each provided with sprockets, a seed-slide mounted at one side of the hopper, a standard depending from the main beam near the front end of the same, a block having a transverse bearing swiveled on the standard, a screw passing through the block for adjusting the same, a transverse axle terminating at one side of the block in a crank, a pitman connecting the crank with the seed-slide, a colter mounted on the axle at the opposite side of the block, a sprocket on the axle at one side of the colter, and an endless sprocket-chain passing around said sprocket and those of the agitator and feed-shafts, substantially as specified.

2. In a machine of the class described, the combination with the framework and the hopper, the latter provided with a recess in its bottom, and with an opening in its side walls of the seed-slide mounted in the recess and means for operating the slide, said slide being provided with seed-openings formed in its inner edge, and transverse recesses or ways above the same, L-shaped seed-plates mounted in the ways and screws passing through the slides and into the plates for adjusting the latter, and located opposite the opening in said side wall of the hopper substantially as specified.

3. In a machine of the class described, the combination with the framework and the hopper, the latter provided with a recess in its bottom, of the seed-slide mounted in the recess, means for operating the slide, said slide being provided at its inner edge with inverted V-shaped seed-openings having ways thereabove, transversely adjustable seed-plates mounted in the ways, screws passing through the slide and into the plates, and a metal plate secured to the outer side of the slide and at its upper edge projecting into a groove in the roof of the slide-receiving recess of the hopper and provided with perforations, opposite the adjusting-screws, substantially as specified.

4. In a machine of the class described, the combination with the framework, the subdivided hopper, and the interposed plate slotted opposite the hoppers, the feed-wheels journaled below the slots and extending through the same, the central block provided with brushes at its opposite edges, and located between the wheels, and the opposite side-blocks slotted and adjustably connected by set-screws outside of the wheels, and provided at their inner edges with brushes, substantially as specified.

In testimony that I claim the foregoing as my own I have hereto affixed my signature in presence of two witnesses.

ROBERT HASSON.

Witnesses:
 G. W. WEBB,
 J. A. GREEN.